INVENTOR.
K. R. MC CONNELL &
P. R. MARZAN
BY E. R. Evans
Attorney

INVENTOR.
K. R. MC CONNELL &
P. R. MARZAN
BY E. R. Evans
Attorney

INVENTOR.
K. R. MC CONNELL &
P. R. MARZAN
BY E. R. Evans
Attorney

INVENTOR.
K. R. MC CONNELL &
P. R. MARZAN
BY E. R. Evans
Attorney

Patented June 2, 1953 2,640,874

UNITED STATES PATENT OFFICE 2,640,874

STARTING AND SWITCHING CONTROL APPARATUS FOR FACSIMILE RECORDERS

Kenneth R. McConnell, Red Bank, N. J., and Peter R. Marzan, New York, N. Y., assignors to Times Facsimile Corporation, New York, N. Y., a corporation of New York Application August 4, 1949, Serial No. 108,514

14 Claims. (Cl. 178—6.6)

This invention relates to control apparatus for telefacsimile systems and more particularly to arrangements for switching beween different ones of a plurality of facsimile recorders and automatically conditioning or starting up the same for reception of messages.

One object of the invention is to provide improved means for starting up an unattended facsimile recorder when a message is to be transmitted from a remote transmitter.

Another object of the invention is to provide a system of this character which will operate solely in response to control signals or current pulses from a transmitting station so that a one-way broadcast or radio channel may be employed. Since the scanning mechanism of the transmitter and the recording mechanism of the recorder must operate in phase and in synchronism, it is necessary in telefacsimile systems to bring the recorder and transmitter mechanism up to a synchronous speed, phase one of them with the other, and then start the transmitting signal modulator equipment and the recording signal equipment to effect recording. Heretofore this has been accomplished by applying power to the motor at the receiving station when the transmitter is ready to transmit a message, phasing the transmitter with the recorder by phasing pulses sent in the opposite direction to the transmitting station from the receiving station and starting the actual transmission at the end of the phasing pulses. Since this required transmission of control or phasing pulses in both directions over the communication circuit or channel, this prior system was not adapted for use with a one-way broadcast or radio channel and could not be used for transmitting or broadcasting simultaneously to a plurality of recorders.

Another object of the invention is to provide an improved arrangement for alternate recording of messages on separate recorders at a receiving station. This arrangement is desirable where messages are transmitted in practically continuous sequence, one immediately after the other, and it is necessary to reload or perform some other operation on the recorder between transmissions. This feature also makes continuous supervision of the receiving equipment unnecessary.

Another object of the invention is to provide an improved control pulse detecting system whereby modulated carrier signals capable of being transmitted over a carrier circuit or radio channel may be employed for controlling or switching the receiving equipment, said signals being of such character that there is practically no possibility of accidental operation of the control equipment by noise or the modulated signals representing facsimile intelligence.

A further object of the invention is to provide, in a receiving station having a plurality of recorders, manually-operable key switches for designating the recorder which is to receive the next message or the order in which the recorders will become operative on consecutive messages.

The foregoing and other objects of the invention will appear from the following description of a preferred embodiment thereof shown in the accompanying drawings, wherein.

Figure 1:
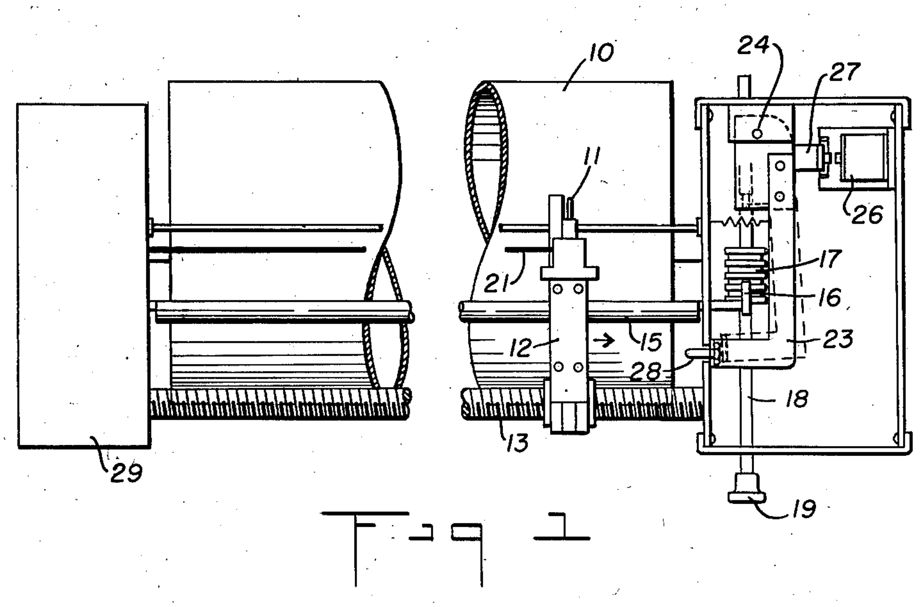
Fig. 1 is a view of a drum-type facsimile recorder illustrating one kind of facsimile machine which may be used in the system.

Referring to the drawings, the system embodying the invention comprises a transmitting station having a facsimile transmitter and means for impressing control current pulses such as phasing and start pulses on a communication line or channel; and a receiving station having a facsimile recorder and means for controlling the recorder to record a message from the transmitting station. In accordance with another feature of the invention, a plurality of recorders are provided at the receiving station and the control apparatus arranged to start up a second recorder to record a second message after the recording of the first message on the first recorder is completed.

Another feature of the invention relates to control-pulse means for controlling a facsimile recorder or recorders solely from the transmitting station to permit the use of a one-way transmitting channel, such as a radio channel, and enable a plurality of recorders to be controlled automatically for simultaneous reception of messages in a broadcasting system.

Since facsimile apparatus requires that scanning mechanism at the transmitter and the recorder be operated in phase and in synchronism, a recorder is preferably employed of a type which can be phased and synchronized without starting up the recording and stylus feeding mechanism. Thus a separately running synchronous drive mechanism can be employed which is started up and phased prior to the transmitting cycle, the recording mechanism being then started up or connected to said drive mechanism in response to a control signal or pulse from the transmitter at the commencement of the message.

In accordance with a further feature of the invention, phasing and control signals are obtained by modulating the signal carrier in a distinctive manner instead of using direct-current impulses or the like. In this manner communication with automatic recorder control can be effected over radio or carrier channels even though they are not adapted for the transmission of direct-current impulses or will not deliver exactly the same frequency out as the input frequency.

Figure 2:
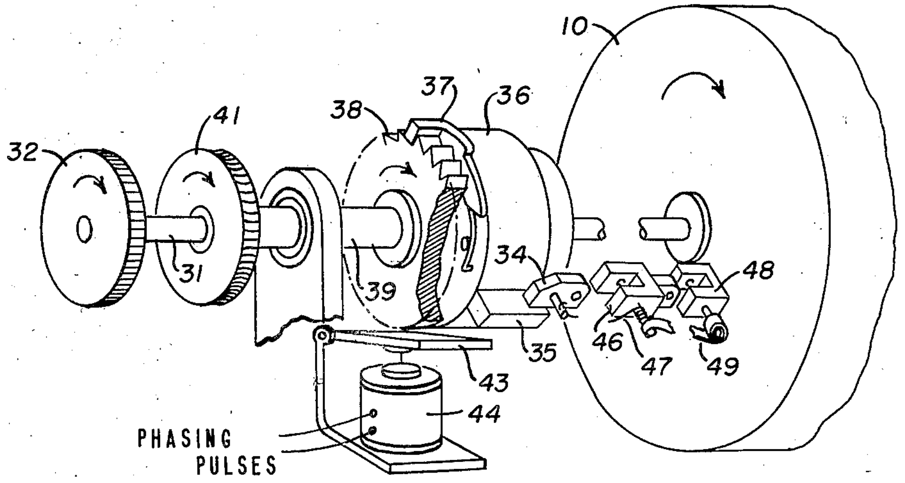
Fig. 2 is a view in perspective showing the synchronous drive and phasing mechanism of the recorder shown in Fig. 1.

Referring to Figs. 1 and 2, a recorder is shown in the drawings of a type generally similar to that shown in the prior patent to Cooley, No. 2,015,742 dated October 1, 1935. This recorder embodies a rotatable drum 10 driven at synchronous speed and an associated recording device, such as a movable stylus 11 adapted to engage and record on a sheet of electro-sensitive recording paper mounted on the drum 10. The stylus 11 is supported on a stylus carrier 12 which is provided with a half-nut engaging a feed screw 13 to cause the stylus to traverse the drum from one end to the other upon rotation of the drum and feedscrew. The half-nut is engaged with the feedscrew 13 by the turning of a cam rod 15 which is connected to a toothed segment 16 engaging a rack 17. The rack 17 is mounted on a reciprocable rod 18 carrying a push-button 19 projecting in front of the recorder. The rod 18 is normally urged outwards by a spring (not shown) to a position in which the cam rod disengages the half-nut from the feedscrew 13. When the half-nut is disengaged, a tensioned cord 21 restores the stylus carrier 12 to the left-hand end of the drum in position to start recording a message.

When the push-button 19 is depressed to engage the half-nut on the stylus carrier 12, with feed screw 13, it is held in the "engaged" position by a pivoted latch member 23 pivoted at the point 24 and engaging a notch in the reciprocable rod 18. The latch member 23 is disengaged from the rod 18 to re-set the stylus either by energization of a magnet 26 having an armature 27 attached to the latch member 23 or by the actuation of the latch member 23 to the unlatching position at the end of the transmitting cycle when the stylus carrier 12 strikes a pin 28 attached to said latch member. The detailed construction of this stylus carrier including the feeding and reset mechanism is described and claimed in the co-pending application of A. G. Cooley, Ser. No. 73,187 filed January 27, 1949, and only those parts of the mechanism which are essential to an understanding of the present invention are shown and described herein. The motor drive mechanism for the drum and leadscrew is contained in the motor housing 29 at the left-hand end of the drum 10.

A preferred form of driving and phasing mechanism is shown in Fig. 2 and is similar to that described and claimed in the patent granted to Austin G. Cooley, No. 2,492,621, dated December 6, 1949. Consequently, only so much is shown of this mechanism as is necessary for an understanding of the present invention. As shown, a drive shaft 31 is connected to the drum 10, the drive shaft being driven by a run motor through a gear 32 which tends to rotate the drum 10 above synchronous speed. In operation, the drum 10 is held back to synchronous speed by the engagement of a latch 34 with a lug 35 on a rotatable sleeve or phasing member 36. The member 36 carries a pivoted pawl 37 adapted to engage the teeth of a ratchet wheel 38. The ratchet is mounted on a hollow shaft 39 concentric with the shaft 31 and connected to a gear 41 which is driven by a constant-speed synchronous motor to maintain the desired synchronous speed of the drum 10 corresponding to that of the transmitter scanning mechanism. The pawl-and-ratchet mechanism 37, 38 permits the synchonous motor to operate continuously when the lug 35 of the phasing mechanism is stopped by engagement with armature 43 of phase magnet 44. When a phasing pulse is received by the phase magnet 44, the armature 43 is attracted by the magnet out of the path of the lug 35 whereupon the phasing member 36 is rotated at synchronous speed and in proper phase relation by the synchronous drive through the pawl and ratchet 37, 38.

The drum 10 and stylus feeding mechanism geared thereto may be stopped during the phasing operation, the rotation of the phasing member 36 being permitted by the pivotal mounting of the latch 34 on a U-shaped bracket 46. A light spring 47 is interposed between the latch 34 and the bracket 46, the spring and latch being constructed so that the latch swings out of the way to permit the phasing member 36 to rotate freely when the drum 10 is stationary and hold the drum 10 back to synchronous speed by engagement of the latch 34 with the lug 35 when the drum is rotating. As shown, the supporting bracket 46 is pivotally mounted on a second bracket 48 attached to the end of the drum 10. A stiff spring 49 normally provides a rigid support for the latch 34 but prevents shearing off the latch if the drum is rotated in the reverse direction.

With this construction it will be apparent that the ratchet member 38 will be rotating at synchronous speed prior to commencement of the transmitting cycle. When a phasing pulse is received, the release of the phasing member 36 by the phasing pulse causes rotation of said member at synchronous speed through the torque transmitted by the pawl-and-ratchet mechanism 37, 38 in a predetermined phase relation dependent upon the time when the phasing pulse is received. The recorder is thus phased and synchronized in readiness to start the recording of a message as soon as message signals are received and the drum 10 is released, the drum rotating until the latch 34 engages the lug 35 after which the drum continues to rotate at synchronous speed and in the proper phase relation with the remote transmitter. A specific synchronizing and drive mechanism is illustrated by way of example, since its operating functions are tied in with the operation of the control apparatus embodying the invention but obviously various other types of recorder mechanism may be employed without departing from the scope of the invention.

Figure 3:
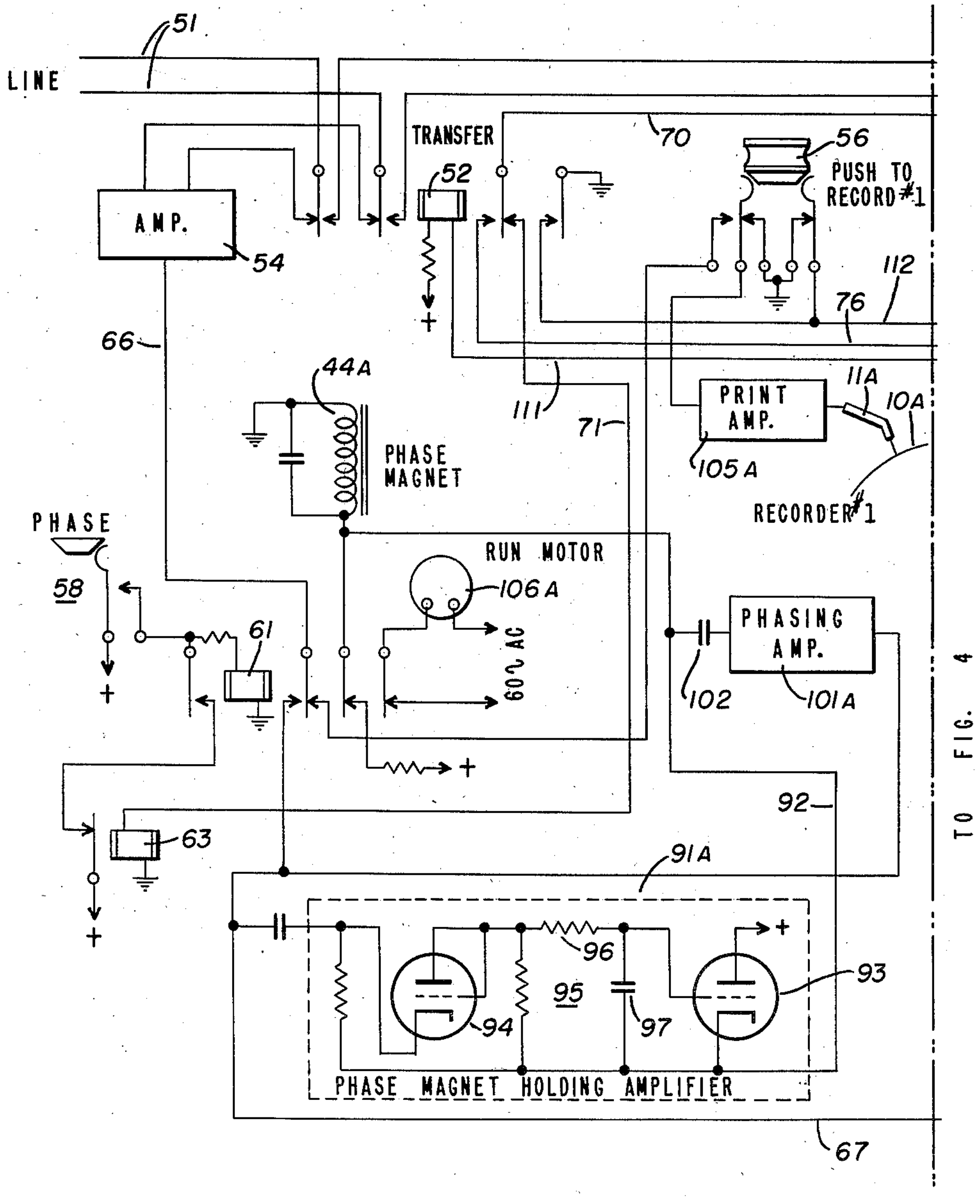
Figs. 3 and 4 are diagrammatic views of the circuits of a pair of recorders arranged for control from a remote transmitting station in accordance with the invention.
Figure 4:
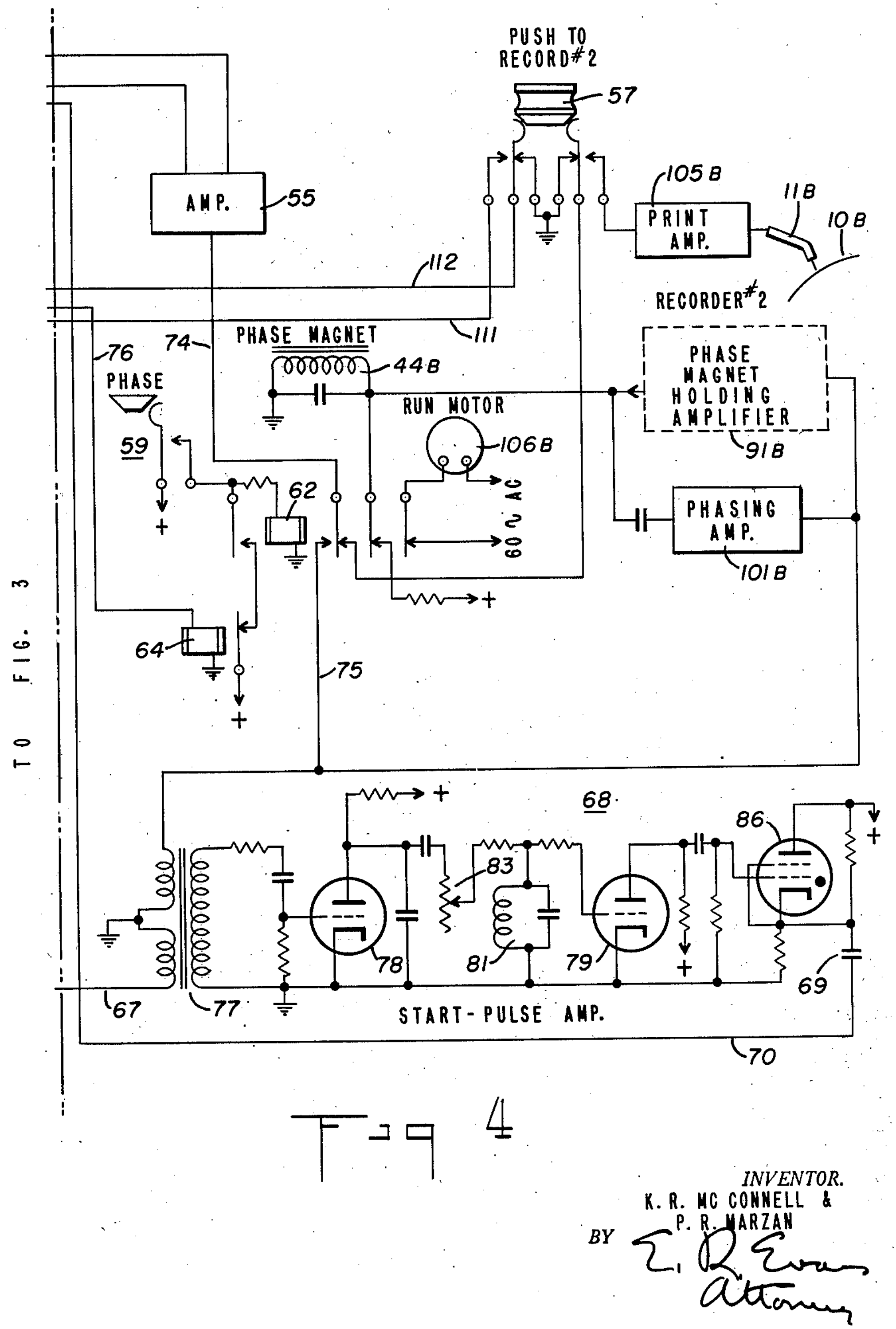

Referring to Figs. 3 and 4, the circuits of two recorders connected to a line or channel 51 are shown by way of example. The line 51 is intended to represent any suitable communication circuit or channel and may be a carrier or radio channel adapted to transmit a modulated alternating-current carrier. As shown, the line 51 terminates in the contacts of a switching or transfer relay 52 adapted when energized to transfer the line circuit from recorder #1 shown in Fig. 3 to recorder #2 shown in Fig. 4. Thus the line is connected either to an amplifier 54 associated with the first recorder or to a second amplifier 55 of the second recorder by the relay 52.

The drum 10a and stylus 11a in the first recorder and its phasing magnet 44a are shown in Fig. 3. Similar elements of the second recorder are indicated at 10b, 11b and 44b in Fig. 4. Each recorder is also provided with a manually operable switch 56 and 57, respectively, and phase switches 58 and 59, respectively. The switches 56 and 57 are actuated by or concurrently with the "record" push button 19 Fig. 1 and the contacts shown in the drawing may conveniently be operated by a cam on the reciprocable rod 18.

A control relay 61, 62 is provided in connection with each phase switch 58 and 59. Each of said control relays is operated by its associated switch and provided with a locking circuit including its left-hand armature and front contact and the armature and back contact of the auxiliary control relays 63, 64, respectively. In response to a start pulse over the line circuit 51 preceding the transmission of a message, one of the relays 63, 64 is operated to disconnect the phasing circuit and start recording the message as will be described hereinafter. The start pulse is applied to the relay 63, through the amplifier 54, conductor 66, the right-hand inner armature and front contact of relay 61, conductor 67, the start pulse amplifier 68, capacitor 69, conductor 70, the right-hand inner armature and back contact of relay 52 and conductor 71. In case the second recorder is connected to the line circuit for reception, the start pulse is connected to the winding 64 through the amplifier 55, conductor 74, the right-hand inner armature and front contact of relay 62, conductor 75, the start pulse amplifier 68, capacitor 69, conductor 70, the right-hand inner armature and front contact of relay 52 and conductor 76. The start pulse amplifier 68 is preferably an amplitude modulation detector with a selective filter-amplifier unit as, for example, an amplifier tuned to a frequency of 60 cycles where the start pulse consists of a 60-cycle modulated carrier in order to render the start pulse amplifier insensitive to any signals except the modulation frequency to which it is tuned.

The amplifier includes an input transformer 77 having two primary windings connected to the conductors 67 and 75 so that start pulses received over either conductor are impressed upon the detector amplifier which comprises two triodes 78 and 79. These triodes may be the two halves of a type 6SN7 tube. The amplifier circuit is conventional except for the parallel resonant circuit 81 tuned to 60 cycles or any other predetermined frequency to render the amplifier sharply selective to this frequency. A potentiometer 83 may be provided to regulate the gain in the amplifier. The ouput of the second stage of the amplifier is connected to the control grid of a gas-filled tube 86 to render the same conductive when the start pulse is received. The resulting current pulse through the tube or thyratron 86 operates relay 63 or 64 through the circuit described above. A thyratron circuit of this type is self extinguishing and thus automatically resets the thyratron.

The phase magnet 44a, 44b is normally held energized until the phasing cycle is started by connection to a source of holding current through the middle right-hand armature and back contact of relay 61 or 62. Relay 61 is operated when the recorder is set up for starting automatically. Under this condition the phase magnet 44a is held energized by continuous current from the phase-magnet holding amplifier 91a through the conductor 92 in circuit with normally conducting tube 93 so long as no modulation or carrier is received over the line circuit 51. When the second recorder is operative, the phase magnet 44b is held up until the phasing pulse is received in a similar manner by means of the phase-magnet holding amplifier 91b. This amplifier 91a, 91b consists of a rectifier 94 and an amplifier tube 93 which may be two halves of a double triode such as a type 6SN7 tube. The tube 93 is not biased so that it is normally conducting until the carrier is received over the line circuit when transmission is started. The carrier is rectified in tube 94 and impressed through the timing circuit 95 upon the grid of the amplifier 93. The timing circuit 95 includes a series resistor 96 and shunt capacitor 97, and imparts a time delay to the operation of the amplifier tube 93 to prevent the phase magnet from being released upon momentary current impulses on the line circuit.

A phasing amplifier 101a, 101b is connected, as shown, between the signal circuit and the phase magnet 44a, 44b. The phasing amplifier 101a amplifies either a current or no-current phasing pulse to generate a current pulse of considerable magnitude to operate the phase magnet. The detailed circuit may be as used in any suitable pulse amplifier or similar to that shown in the patent granted to Boris F. Grib, No. 2,490,126, dated December 6, 1949, and includes a coupling capacitor 102.

A signal amplifier 105a, 105b, is also provided for amplifying the printing signals impressed upon the stylus as in conventional stylus recording systems. A run motor 106a, 106b is provided for driving the drum 10 and the recording mechanism, and as shown is started up by the release of relay 61 at the end of the phasing operation.

The operation of the preferred system embodying the invention shown by way of example in Figs. 3 and 4 is as follows: After loading the recording drum with recording paper, the "record" buttons of switches 56 and 57 are depressed in the order in which the two recorders are to operate. Thus, if the pushbutton switch 56 is operated before the switch 57, recorder #1 shown in Fig. 3 will record the first message and recorder #2 the succeeding message. After the switches 56 and 57 are operated, the phasing switches 58 and 59 are actuated momentarily. The operation of the switches 58 and 59 energizes the associated control relays 61 and 62. Upon energization relays 61 and 62 become locked up through their left-hand armatures and front contacts to the normally closed contacts of relays 63 and 64. The operation of relay 61 opens the circuit of the run motor 106a and also the holding circuit of the phasing magnet 44a which normally holds the phasing magnet energized. However, as explained above, if the remote transmitter has not been started up so that there is no carrier on the line 51, the phase magnet 44a is held operated by the plate current of the tube 93 of the phase-magnet holding amplifier. The energization of relay 61 also transfers the signal circuit of the amplifier 54 through conductor 66 and the inner right-hand armature of said relay to the phase-magnet holding amplifier 91a and the start pulse amplifier 68, Fig. 4.

It will be seen therefore that recorder #1 is in readiness for phasing and for subsequent recording of a message. If, however, the pushbutton switch 57 had been actuated before switch 56, the switching or transfer relay 52 would have been operated through a circuit which may be traced from the winding of said relay through a conductor 111, the left-hand make contacts of switch 57, conductor 112, and the right-hand normally closed contacts of switch 56. Relay 52 becomes energized and is locked up through the above-described circuit and the right-hand outer armature and front contact of said relay so that the relay remains locked up after the key switch 56 is operated. The energization of relay 52 transfers the line circuit or channel 51 through its left-hand armatures and front contacts to the amplifier 55 and the operation of relay 62 connects said amplifier to the phasing circuit as described above in connection with recorder #1, Fig. 3. Thus, the sequence of recorder operation is controlled by the sequence in which the switches 56 and 57 are operated.

In transmission, the remote transmitter impresses one or more phasing pulses on the circuit or line, followed by a start pulse of a character adapted to operate the selective start pulse amplifier 68. Then the message is transmitted in the form of an amplitude-modulated 1800-cycle carrier, for example. Any suitable transmission method may obviously be employed, the present invention relating to automatic control of a recorder and automatic switching between a plurality of recorders.

As soon as the carrier frequency is received (the transmitter turned on), the rectification of the carrier signal in the rectifier tube 94 impresses a cut-off bias potential upon the grid of the tube 93 and releases the phase magnet 44a. The release of the armature of the phase magnet stops the rotation of the phasing member 36 of the recorder until a phasing pulse is received. The phasing pulse is amplified in the phasing amplifier 101a and energizes the phase magnet 44a to release the phasing member of the recorder. The phasing pulses continue until the start pulse is transmitted, and thus withdraw the armature of the phase magnet out of the path of the phasing member during each revolution. The start control pulse, which may be a 60-cycle amplitude modulated carrier pulse, is then transmitted from the remote transmitter to start up the driving and recording mechanism of recorder #1 and to hold the phase magnet armature retracted. The start control pulse is impressed upon the start pulse amplifier 68 through the above-described circuit and, on account of the tuning of the amplifier by the resonant circuit 81, the start pulse produces current flow in the gas or thyratron tube 86. Other selective circuits or a tuned relay may be employed to detect the start pulse as well known in the art.

A current pulse is thus generated in the tube 86 and traverses the capacitor 69 and conductor 70 and the inner right hand armature and back contact of relay 52 to momentarily energize the winding of relay 63. The operation of relay 63 opens the locking circuit of relay 61 and the latter relay becomes de-energized. The deenergization of relay 61 closes the circuit of the run motor 106a thus starting up the drum 10 and the feed screw 13. The relay 61 also re-closes the holding circuit of the phasing magnet 44a and transfers the signal circuit from amplifier 54 through the left-hand make contacts of the switch 56 to the print amplifier 105a of recorder #1. At the end of the message the switch 56 is automatically opened by the re-setting of the "record" push button 19 as described above.

Upon the restoration of the switch 56 to normal as described, a circuit is closed for operating transfer relay 52 which may be traced through conductor 111, left-hand make contacts of switch 57 and conductor 112 to the right-hand break contacts of the switch 56. The operation of the switching or transfer relay 52 in this manner transfers the signal and start pulse circuits to recorder #2, Fig. 4, as described above. The operation of the recorder control circuits of Fig. 4 in response to the subsequent transmission of phasing and start pulses from the remote transmitter is the same as described above in connection with the recorder shown in Fig. 3. Thus the second message is automatically recorded on recorder #2 without any attention from the operator except to load the drum with recording paper and prepare the circuit for operation by actuating the switches 57 and 59. At the end of the message the manually operable switch 57 is restored through its connection with the recorder operating mechanism, thus opening the print circuit through the print amplifier 105b and releasing the switching or transfer relay 52. Thus, if the recorder #1 was reloaded during the transmission of the second message, it is ready to be phased and started up automatically under the control of the remote transmitter for the recording of a subsequent message.

Figure 5:
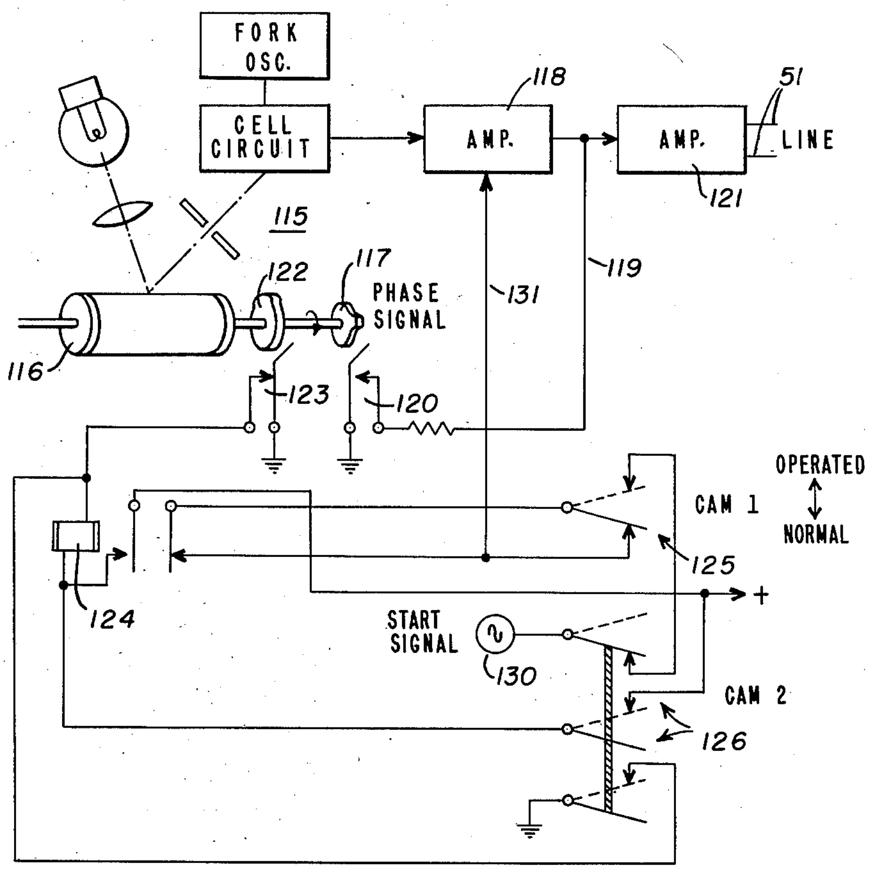
Fig. 5 is a diagrammatic view of typical control apparatus at the transmitting station showing conventional means for generating phasing and start current pulses in proper sequence to operate the control apparatus of Figs. 3 and 4.
Figure 6:
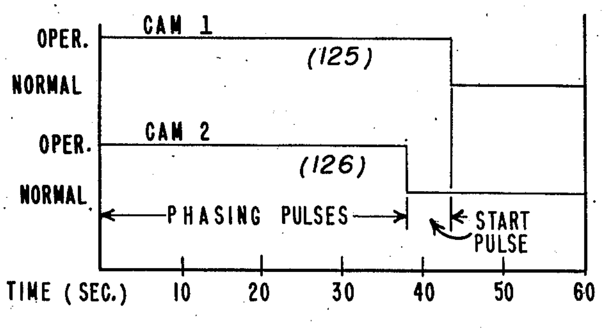
Fig. 6 is a timing graph, showing a preferred or typical control pulse timing by way of example, of the apparatus shown in Fig. 5.

The phasing and start pulses may be generated at the transmitting station by the use of conventional apparatus. A preferred timing mechanism for such apparatus is shown in Fig. 5 wherein a conventional drum-type transmitter is represented at 115 similar to that shown in the above-mentioned Cooley Patent No. 2,015,742. The transmitter includes a rotating drum 116 carrying the copy to be transmitted and, as shown, a cam 117 on the end of the drum shaft is arranged to transmit no-current or low-current phasing pulses by shorting the amplifier 118 through a resistor, once during each rotation of the drum 116. The output of the amplifier 118 is connected through conductor 119 to the contacts 120 which are periodically closed by the cam 117. The second amplifier 121 is adapted to amplify the start and facsimile signals impressed upon the line or connecting channel. A second cam 122 is also provided on the shaft of the drum 16 for operating control contacts 123 in the circuit of a control relay 124. The control system at the transmitter also includes cam-operated switches 125 and 126 for convenience in automatically timing the phasing and start pulses after the transmitter has been started up by the transmitting operator. The timing of the switches 125 and 126 is shown in Fig. 6.

In operation the transmitting operator starts the drive mechanism for the drum 116 to obtain synchronous speed of the scanning mechanism. Initialy both switches 125 and 126 are operated to positions shown in dotted lines and relay 124 is energized through a circuit including the middle contact of switch 126 or the parallel locking circuit through the inner right hand armature and front contact of the relay 124. The lower contact of the switch 126 provides an operating circuit for relay 124 in parallel with the cam operated contacts 123 so that relay 124 remains operated as long as switch 126 is closed irrespective of the operation of the cam 122. Thus a series of phasing pulses is continuously transmitted by the intermittent closure of shorting contacts 120 by the phasing cam 117. These pulses are interruptions in the steady carrier frequency obtained from the fork oscillator or other constant-frequency source since the transmitter is controlled or adjusted so that during the preliminary phasing operation it is not scanning the copy to be transmitted.

At the end of a predetermined time, cam #2 of the timing switch operates the switch 126, thereby opening the circuit from the battery through the middle and lower contacts of switch 126 to the control relay 124. However, relay 124 remains locked up through the contacts 123 unless these contacts are opened by cam 122. Thus the cam 122 prevents relay 124 from deenergizing except in a desired time relation to the operation of the phasing contacts 120. However, after switch 126 opens, when the contacts 123 are opened by the cam 122, relay 124 becomes de-energized and closes a circuit from the start signal source 130, which may be a 60-cycle source, through the upper contacts of switches 126 and 125, the outer armature and back contact of relay 124 and conductor 131 to modulate the amplifier 118 through a modulator circuit in the amplifier and thereby impress the 60-cycle modulated pulse through amplifier 121 on the line or channel 51. The start pulse is interrupted by the subsequent operation of the switch 125 whereupon the scanning elements of the transmitter 115 may commence transmission of the copy in the usual manner.

The transmission of the phasing and start control pulse preceding each message in this manner is operative to start up a recorder as described above and to transfer successive messages to each of the plurality of recorders at unattended receiving stations. Since the recorders are under the control of the pulses transmitted from the transmitting station, a one-way circuit or broadcast channel may be employed. While control pulses consisting of modulated or interrupted carrier frequency are preferably used so that carrier or radio channels may be employed, obviously other selective control pulses may be employed, as well known in the art.

The transmission of facsimile signal currents is commonly effected by several methods of modulating arrangements. Consequently the type of modulation used for the "start" signal is preferably of the same type and range as the modulation used for the facsimile transmission in order not to be lost in any modulation conversions used between the transmitter and the recorder.

Various modifications in the system and apparatus described above for the purpose of explaining the invention may be made without departing from the scope thereof. For example, after initially phasing the transmitter and recorder, it is not necessary to repeat the phasing operation for each transmitting cycle if the machines can be stopped and started without throwing them out of phase. As explained above, a recorder of this type is shown in Figs. 1 and 2. However no claim is made herein to any structural or mechanical features of the recorder or transmitter per se.

We claim:

1. In a telefacsimile system, a communication channel, a facsimile transmitter connected to one end of said channel, a facsimile recorder connected to the other end of said channel, said transmitter and recorder having movable scanning and recording mechanism operating in synchronism during the transmitting cycle, means at the transmitter for sending a start signal over said communication channel, means for phasing the scanning and recording mechanism, driving means including a motor for operating the recording mechanism of said recorder, means including a control relay for energizing the recording circuit of the recorder, means at the recorder for starting said motor from rest and for operating said control relay to close the recording circuit of the recorder to record copy from the transmitter and means whereby said last mentioned means is controlled by said start signal.

2. In a telefacsimile system, a facsimile transmitter, a facsimile recorder, said transmitter and recorder having movable scanning and recording mechanism operating in synchronism during the transmitting cycle, said transmitter including means for generating picture signals consisting of modulated carrier current, driving and phasing mechanism for the recording mechanism of said recorder, means at the transmitter for generating control signals by interrupting and modulating said carrier current, means at the recorder for starting up said drive mechanism and for phasing the recording mechanism with the scanning mechanism of the transmitter and means whereby said last mentioned means is responsive to said control signals whereby a one-way broadcast or radio channel may be used for automatic reception at unattended receiving stations.

3. In a telefacsimile system, a communication channel, a facsimile transmitter connected to one end of said channel, two facsimile recorders connected to the other end of said channel, said transmitter and recorders having movable scanning and recording mechanisms operating in synchronism during the transmitting cycle, means at the transmitter for impressing control signals on said communication channel, means for starting in motion the recording mechanism of one recorder, means whereby the last mentioned means is responsive to a control signal received over said communication channel, means for rendering the recording mechanism operative to record transmitted copy from said transmitter, means for preparing the second recorder for reception of a subsequent control signal and means for switching said communication channel to said second recorder a predetermined time after starting to record copy on the first mentioned recorder whereby the succeeding transmission copy is recorded on the second recorder.

4. In a system of the character described, a communication channel or circuit, a facsimile transmitter provided with scanning mechanism connected thereto, means at the transmitter for applying facsimile signals and phasing and control current pulses to said channel, including a plurality of phasing current pulses preceding each message transmitting cycle of the transmitter, a facsimile recorder connected to said channel and having recording mechanism including a synchronously driven scanning member operating in phase and in synchronism with the scanning mechanism of said transmitter during the transmitting cycle, phasing means in said recorder for phasing the recording mechanism preliminary to recording a message, means whereby said phasing means is responsive to a phasing pulse from the transmitter, means associated with said recorder for detecting a control current pulse from the transmitter after the recording mechanism has been phased, driving means for said recording mechanism, means to operate the recording mechanism to start the recording of a message and means including said control current pulse-detecting means for operating said driving and said recording mechanism operating means upon receipt of a control current pulse from the transmitter.

5. In a system of the character described, a communication channel or circuit, a facsimile transmitter provided with scanning mechanism connected thereto, means at the transmitter for applying phasing and control current pulses to said channel, including a plurality of phasing current pulses preceding each message transmitting cycle of said transmitter, a facsimile recorder connected to said channel and having recording mechanism operating in phase and in synchronism with the scanning mechanism of said transmitter during the transmitting cycle, phasing means in said recorder for phasing the recording mechanism in response to a phasing pulse from the transmitter preliminary to recording a message, a control relay associated with said recorder, a filter-amplifier unit for detecting a control current pulse from the transmitter, means including said control relay for connecting and disconnecting said recording mechanism from the channel and means including said filter-amplifier unit for operating the control relay to connect the recording mechanism to the channel to start recording the message upon the receipt of a control current pulse from the transmitter.

6. A facsimile communication system as set forth in claim 5 in which the recording mechanism of the recorder includes a run motor for driving the scanning elements of said mechanism and means including said control relay is provided to start up the run motor concurrently with the connection of the recording mechanism to the communication channel.

7. In a system of the character described, a facsimile recorder having a recording mechanism and a synchronous motor for maintaining said recording mechanism in synchronism with its remote transmitter during the recording cycle, said recorder also comprising phasing means for phasing the recording mechanism preliminary to recording a message and means whereby said phasing means is operated by phasing pulses from the transmitter, a communication line or channel connecting the recording mechanism to the transmitter, control means for starting the recording mechanism operating at synchronous speed and in phase with the transmitter and means whereby said control means is responsive to a control current pulse transmitted over said communication line or channel.

8. In a facsimile system of the character described, a receiving station provided with two facsimile recorders adapted for alternate operation, a communication line or channel for said recorders, a switching relay for connecting said line or channel alternately to one or the other of said recorders, means for phasing the connected recorder, means for operating said last mentioned means in response to a phasing pulse transmitted over said communication line or channel, means for starting said connected recorder to receive a message, means whereby said last mentioned means is responsive to a control pulse of a different character than the phasing pulse, means for operating said switching relay to transfer said line or channel to the second recorder after said message is recorded and means including said pulse responsive means for operating said second recorder to record a second message.

9. In a facsimile system of the character described, a receiving station, two facsimile recorders at said station adapted for alternate operation, a communication line or channel, a switching relay adapted to connect either recorder to said line or channel, manually-operated switches for predetermining the order in which said recorders will be operative to receive the subsequent messages and means for controlling said recorders in sequence over said line or channel to phase and start up said recorders and record two successive messages in said predetermined order.

10. In a facsimile system of the character described, a communication line or channel, a facsimile transmitter connected to one end of said line or channel, a plurality of facsimile recorders at the other end of said line or channel, means associated with said transmitter for transmitting phasing and start control pulses over said line or channel, means for starting first one and then another of said recorders to record successive messages from the transmitter on separate recorders and means whereby said starting means is responsive to said phasing and start control pulses before each recording of a message.

11. In a facsimile system of the character described, a communication line or channel, a facsimile transmitter connected to one end of said line or channel, a plurality of facsimile recorders at the other end of the line or channel, switching means to control the connection of said recorders to the line or channel and means for controlling the starting, phasing and recording operation of said recorders in sequence solely from the transmitting end of the line or channel to record successive messages on separate ones of said recorders.

12. In a facsimile system of the character described, a communication line or channel, a facsimile transmitter connected to one end of said line or channel, a plurality of facsimile recorders at the other end of said line or channel, means for impressing an alternating carrier on said line or channel, means at the transmitter for modulating said carrier to produce a distinctive control pulse, a selective circuit adjacent said recorders for detecting and responding only to said control pulse and means including a relay connected to said selective circuit for starting up said recorders and effecting recording of messages from said transmitter.

13. In a facsimile system having a drum-type recorder and means for driving the drum and conditioning the recording mechanism of said recorder for operation in response to received signals, in combination, a remote facsimile transmitter, means associated with the transmitter for generating facsimile signals in the form of a modulated carrier and a distinctive control pulse in the form of a modulated carrier, and means associated with said recorder for detecting said control pulse and starting up the recorder mechanism in response thereto.

14. In a facsimile system a recorder having a rotatable drum for supporting the recording sheet, a stylus adapted to record on said recording sheet carried by the drum, feeding means for causing relative scanning motion of the stylus and recording sheet, driving means for driving the drum and feeding means during the recording cycle, said driving means including phasing means for phasing the drum, manually operable means for preparing the phasing and recording means for operation in response to a control pulse or signal over the line circuit, means for starting up the recording mechanism to record a message in response to such a pulse or signal and means for re-setting said manually operable means at the end of a message to prevent the recorder from operating again until the drum is reloaded and the manually operable means actuated.

KENNETH R. McCONNELL.
PETER R. MARZAN.

References Cited in the file of this patent

UNITED STATES PATENTS

| Number | Name | Date |
|---|---|---|
| 1,784,526 | Karolus | Dec. 9, 1930 |
| 2,176 312 | Rassou | Oct. 17, 1939 |
| 2,249,435 | Potts | July 15, 1941 |
| 2,275,249 | Cooley | Mar. 3, 1942 |
| 2,304,775 | Blanton | Dec. 12, 1942 |
| 2 537,610 | Volz | June 9, 1951 |
| 2,540,922 | Wickham | Feb. 6, 1951 |